(12) United States Patent
Morrison

(10) Patent No.: US 8,435,007 B2
(45) Date of Patent: May 7, 2013

(54) HYBRID TURBOMACHINERY COMPONENT FOR A GAS TURBINE ENGINE

(75) Inventor: Adam J. Morrison, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 701 days.

(21) Appl. No.: 12/639,576

(22) Filed: Dec. 16, 2009

(65) Prior Publication Data

US 2010/0166551 A1     Jul. 1, 2010

Related U.S. Application Data

(60) Provisional application No. 61/203,811, filed on Dec. 29, 2008.

(51) Int. Cl.
*F01D 9/02*     (2006.01)
(52) U.S. Cl.
USPC ............... 416/193 A; 416/204 A; 416/219 R; 416/241 R; 416/241 B; 29/888.025; 29/889.21; 29/889.23
(58) Field of Classification Search .............. 416/193 A, 416/204 A, 219 R, 241 R, 241 A, 241 B, 416/248; 29/888.025, 889.21, 889.23
See application file for complete search history.

(56) References Cited

U.S. PATENT DOCUMENTS

| | | | |
|---|---|---|---|
| 2,749,029 A | 6/1956 | Goetzel et al. | |
| 3,756,745 A | 9/1973 | Alver et al. | |
| 3,761,200 A * | 9/1973 | Gardiner | 416/220 R |
| 3,801,222 A | 4/1974 | Violette | |
| 4,019,832 A | 4/1977 | Salemme et al. | |
| 4,183,720 A | 1/1980 | Brantley | |
| 4,232,996 A | 11/1980 | Stoffer | |
| 4,501,053 A * | 2/1985 | Craig et al. | 29/889.721 |
| 5,318,406 A | 6/1994 | Bardes | |
| 6,632,070 B1 * | 10/2003 | Tiemann | 415/191 |
| 7,094,035 B2 | 8/2006 | Kramer et al. | |
| 7,762,781 B1 * | 7/2010 | Brown et al. | 416/193 A |
| 7,874,804 B1 * | 1/2011 | Brown | 416/193 A |
| 7,878,763 B2 * | 2/2011 | Keith et al. | 416/193 A |
| 7,976,281 B2 * | 7/2011 | Keith et al. | 416/193 A |
| 2002/0187046 A1 | 12/2002 | Beutin et al. | |
| 2006/0140771 A1 | 6/2006 | Carper et al. | |
| 2006/0216154 A1 | 9/2006 | McMillan | |
| 2008/0232969 A1 * | 9/2008 | Brault et al. | 416/219 R |

* cited by examiner

*Primary Examiner* — Igor Kershteyn
(74) *Attorney, Agent, or Firm* — Krieg DeVault LLP

(57) ABSTRACT

The present invention provides a hybrid turbomachinery component for use in a gas turbine engine. The hybrid turbomachinery component may be operative to direct the working fluid of the gas turbine engine and/or addi energy to the working fluid and/or extract energy from the working fluid. One or more portions of the hybrid turbomachinery component are made from one material, and other portions of the hybrid turbomachinery component are made from another material.

20 Claims, 3 Drawing Sheets

HYBRID TURBOMACHINERY COMPONENT FOR A GAS TURBINE ENGINE

CROSS REFERENCE TO RELATED APPLICATIONS

The present application claims the benefit of U.S. Provisional Patent Application No. 61,203,811, filed Dec. 29, 2008, and is incorporated herein by reference.

FIELD OF THE INVENTION

The present invention relates to gas turbine engines, and, more particularly, to a hybrid turbomachinery component for a gas turbine engine.

BACKGROUND

Gas turbine engines employ turbomachinery components, such as blades and vanes, to direct the working fluid, and to add energy to the working fluid and extract energy from the working fluid. In many cases, the turbomachinery components are made of a singular material.

SUMMARY

The present invention provides a hybrid turbomachinery component for use in a gas turbine engine. The hybrid turbomachinery component may be operative to direct the working fluid of the gas turbine engine and/or add energy to the working fluid and/or extract energy from the working fluid. One or more portions of the hybrid turbomachinery component are made from one material, and other portions of the hybrid turbomachinery component are made from another material.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
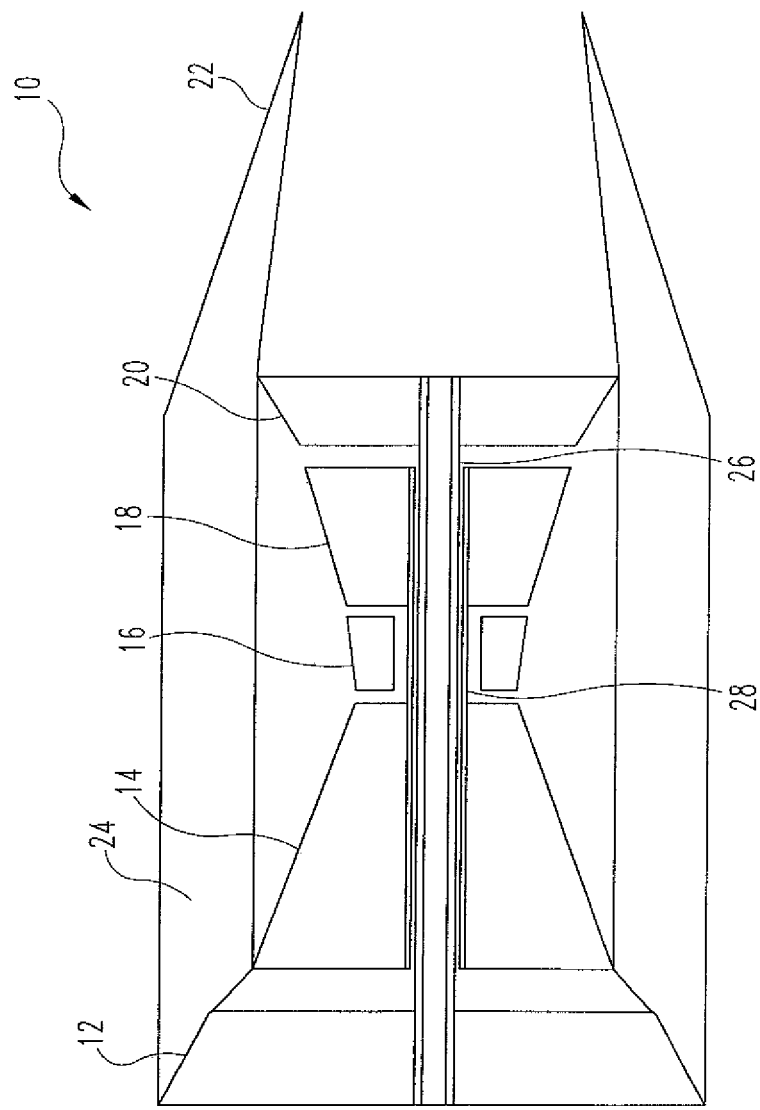
FIG. 1 schematically depicts a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, a gas turbine engine 10 in accordance with an embodiment of the present invention is schematically depicted.

In the embodiment of FIG. 1, various features, components and interrelationships therebetween of aspects of an embodiment of the present invention are depicted. However, the present invention is not limited to the particular embodiment of FIG. 1 and the components, features and interrelationships therebetween as are illustrated in FIG. 1 and described herein.

Gas turbine engine 10 includes a fan 12, a compressor 14, a combustor 16, a high pressure (HP) turbine 18, a low pressure (LP) turbine 20, an exhaust nozzle 22 and a bypass duct 24. LP turbine 20 is drivingly coupled to fan 12 via an LP shaft 26. HP turbine 18 is drivingly coupled to compressor 14 via an HP shaft 28. In the present embodiment, gas turbine engine 10 is a turbofan engine, e.g., such as might be employed as a propulsion power plant for a fixed wing aircraft. In one form, engine 10 is a two-spool mixed flow turbofan engine. engine 10 may be a three-spool turbofan engine, a single or multiple spool turbojet engine, or may be a turboshaft or turboprop engine.

During the operation of gas turbine engine 10, air is drawn into the inlet of fan 12 and pressurized by fan 12. Some of the air pressurized by fan 12 is directed into compressor 14. The+ balance of the pressurized air is directed into bypass duct 24. Bypass duct 24 directs the pressurized air to exhaust nozzle 22, providing a component of the thrust output by gas turbine engine 10. Compressor 14 receives the pressurized air from fan 12, and further pressurizes the air, which is then directed to combustor 16. Fuel is mixed with the air in combustor 16, which is then combusted. The hot gases exiting combustor 16 are directed into HP turbine 18, which extracts energy from the hot gases in the form of mechanical shaft power, which is used to drive compressor 14 via HP shaft 28. The hot gases exiting HP turbine 18 are directed into LP turbine 20, which extracts energy in the form of mechanical shaft power that is used to drive fan 12 via LP shaft 26. The hot gases exiting LP turbine 20 are directed into nozzle 22, and provide a component of the thrust output of gas turbine engine 10.

Figure 2:
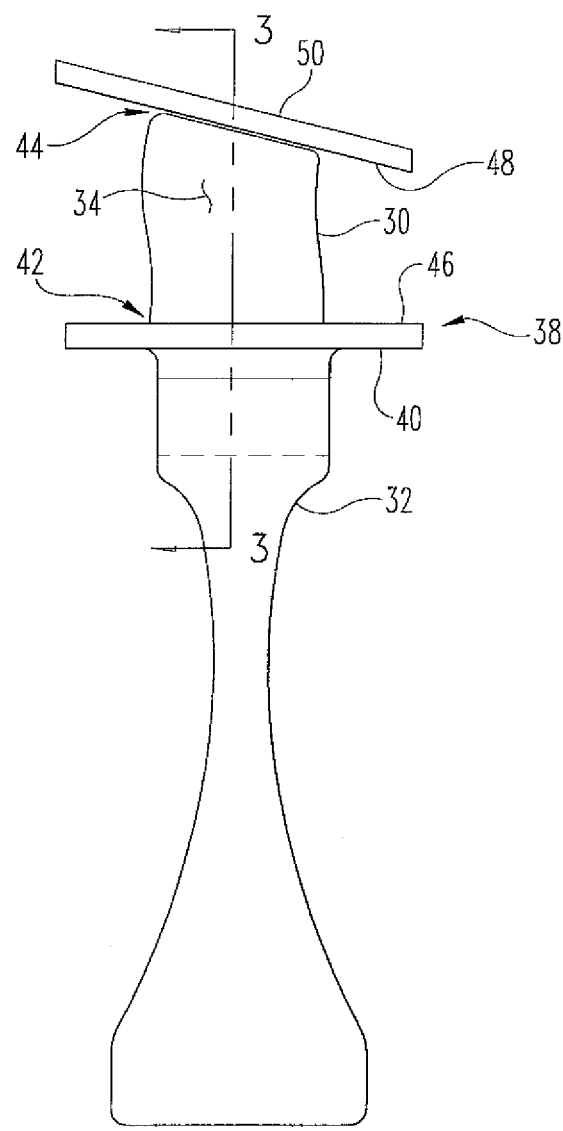
FIG. 2 depicts a portion of a rotating fan stage in accordance with an embodiment of the present invention.

Referring now to FIG. 2, a portion of fan 12 in accordance with an embodiment of the present invention is schematically depicted. In the embodiment of FIG. 2, various features, components and interrelationships therebetween of aspects of an embodiment of the present invention are depicted. However, the present invention is not limited to the particular embodiment of FIG. 2 and the components, features and interrelationships therebetween as are illustrated in FIG. 2 and described herein.

Fan 12 includes a plurality of blades 30 and a plurality of vanes (not shown). Each blade 30 is secured in a rotating disk 32. Disk 32 transmits the power received from LP turbine 20 via LP shaft 26 to blades 30 to pressurize the air received by fan 12. Each blade 30 is a hybrid turbomachinery component. The term, "hybrid," as used herein, refers to portions of blade 30 being made of at least two different materials, such as some portions of blade 30 being made from a metallic material, whereas other portions may be made from a nonmetallic material, such as a composite material. The term, "turbomachinery component," as used herein, pertains to a component that performs a turbomachine function, i.e., a flowpath-defining structure, and/or an aerodynamic component that transfers energy to or from the working fluid, e.g., air. Although described herein as fan blades 30 secured in rotating fan disk 32, in other embodiments, blades 30 may be compressor blades secured in one or more compressor disks.

Blade 30 includes an airfoil portion 34, an attachment portion 36, and a flowpath structure 38 in the form of a platform 40. A "flowpath structure" is a structure that defines, at least in part, a flowpath that guides working fluid flow in a turbomachine, such as a platform, tip shroud or mid-span shroud of a blade or vane. Airfoil portion 34 extends from a root 42 adjacent platform 40 to a tip 44 at the radially outermost extents of blade 30. An annular flowpath through fan 12 is defined, in part, by an outer surface 46 of platform 40. An inner surface 48 of a fan shroud 50 defines the outermost extents of the flowpath through fan 12.

Figure 3:
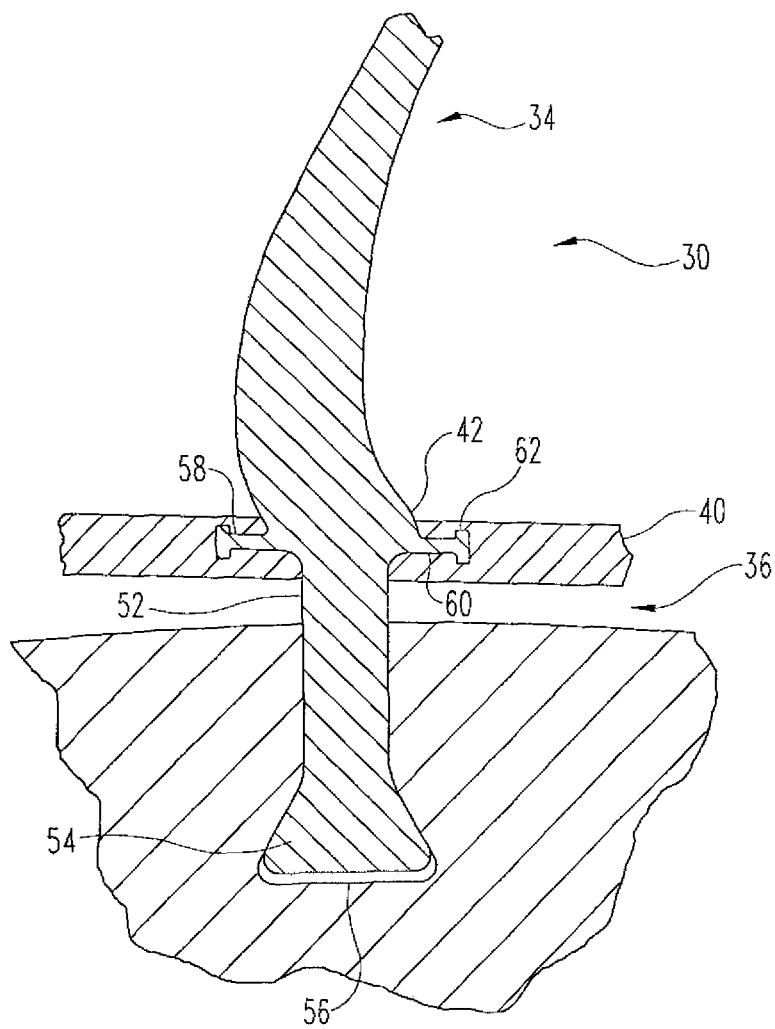
FIG. 3 depicts a hybrid turbomachinery component that may be employed in the rotating fan stage of the embodiment of FIG. 2.

Referring now to FIG. 3, blade 30 of the present embodiment is described in greater detail. In the embodiment of FIG. 3, various features, components and interrelationships therebetween of aspects of an embodiment of the present invention are depicted. However, the present invention is not limited to the particular embodiment of FIG. 3 and the components, features and interrelationships therebetween as are illustrated in FIG. 3 and described herein.

Attachment portion 36 extends from airfoil portion 34, and includes a stalk 52 extending radially inward and culminating in a dovetail 54. Blade 30 is radially secured to rotating disk 32 via a mating dovetail slot 56 formed in disk 32. Although a dovetail arrangement is employed to secure blade 30 to disk 32 in the present embodiment, it will be understood that other attachment types may be employed in other embodiments.

Blade 30 includes a retention feature 58 for retaining platform 40. Retention feature 58 extends outward from blade 30. In one form, retention feature 58 includes a body 60 that extends approximately perpendicularly from airfoil portion 34 and attachment portion 36. In other embodiments, other orientations of retention feature 58 may be employed. In one form, retention feature 58 includes a double retainer lip 62 at the outer end of body 60. It will be understood that the depicted embodiment of retention feature 58 is exemplary in nature, and that the present invention is not so limited. Rather, other configurations may be employed in other embodiments. In any case, retention feature 58 is structured to retain flowpath structure 38 (platform 40 in the present embodiment) in position on blade 30, e.g., under rotationally and aerodynamically imposed loading.

In the present embodiment, airfoil portion 34, attachment portion 36 and retention feature 58 are formed as a unitary structure, i.e., formed as a single integrated structure, e.g., in the form of a forging. The forging may be machined in order to achieve the requisite tolerances. The forging material in the present embodiment is a titanium alloy. In other embodiments, it is contemplated that the unitary structure may be twisted plate stock, e.g., of a titanium alloy, which may be machined to achieve the desired final dimensions. In yet other embodiments, the unitary structure may be in the form of a casting. In still other embodiments, it is contemplated that airfoil portion 34, attachment portion 36 and/or retention feature 58 may be formed individually and subsequently jointed together, e.g., via brazing. Although the present embodiment envisages the use of a titanium alloy, it will be understood that other materials, metallic and/or nonmetallic, may be employed in other embodiments.

In one form, flowpath structure 38 (platform 40 in the present embodiment) is insert-molded onto retention feature 58. For example, in the present embodiment, the midsection of blade 30 is placed within a mold. A heated chopped-fiber composite material is then injected into the mold, flowing around and encapsulating retention feature 58, and forming platform 40. Once cooled and solidified, platform 40 is retained onto the balance of blade 30 by retention feature 58. For example, body 60 helps secure platform 40 against radial loads, and double retainer lip 62 helps secure platform 40 against axial loads.

Although the present embodiment contemplates a chopped-fiber composite material for platform 40, it will be understood that other materials for platform 40 may be employed without departing from the scope of the present invention. For example, conventional thermoplastics may be employed with or without the use of wound fibers.

Although the present embodiment is described herein with respect to a fan blade, it will be understood that the present invention is equally applicable to other turbomachinery components, such as fan vanes, compressor blades and/or vanes, and turbine blades and/or vanes, e.g., wherein the material employed for flowpath structure 38 (platform 40 in the present embodiment), is selected in accordance with the temperatures and loading anticipated at such locations.

Embodiments of the present invention may include a hybrid turbomachinery component for a gas turbine engine, including an airfoil portion formed of a first material; an attachment portion extending from a root of the airfoil portion and structured to secure the airfoil portion to the gas turbine engine; a retention feature disposed adjacent to one of the attachment portion and the airfoil portion; and a flowpath structure molded around the retention feature and formed of a second material different than the first material, wherein the flowpath structure is retained by the retention feature.

The airfoil portion and the attachment portion may be formed as a unitary structure from the first material. The hybrid turbomachinery component may be structured as a blade, wherein the flowpath structure is a blade platform defining in part a flowpath in the gas turbine engine. The attachment portion may be structured to secure the blade to a rotating disk in one of a fan and a compressor of the gas turbine engine. The rotating disk may include a slot, and the attachment portion may include a dovetail structured to engage and be radially retained by the slot in the rotating disk.

The retention feature may extend substantially perpendicular from the one of the attachment portion and the airfoil portion. The first material may be a metal alloy and the second material may be a composite material. The flowpath structure may encapsulate the retention feature.

Embodiments of the present invention may include a gas turbine engine, including at least one of a fan and a compressor having a hybrid turbomachinery component. The hybrid turbomachinery component may include an airfoil portion formed of a first material; an attachment portion extending from a root of the airfoil portion, wherein the attachment portion is operative to secure the airfoil portion to the gas turbine engine; a retention feature adjacent to one of the attachment portion and the airfoil portion; and a flowpath structure molded around the retention feature and formed of a second material different than the first material, wherein the flowpath structure is retained by the retention feature.

The airfoil portion and the attachment portion may be formed as a unitary structure from the first material. The hybrid turbomachinery component may be structured as a blade, and the flowpath structure may be a blade platform defining in part a flowpath in the gas turbine engine.

The attachment portion may be structured to secure the blade to a rotating disk in one of the fan and the compressor of the gas turbine engine. The rotating disk may include a slot, and the attachment portion may include a dovetail structured to engage and be radially retained by the slot in the rotating disk.

The retention feature may extend substantially perpendicular from the one of the attachment portion and the airfoil portion. The first material may be a metal alloy and the second material may be a composite material. The flowpath structure may encapsulate the retention feature.

Embodiments of the present invention may include a method for producing a hybrid turbomachinery component, including forming an airfoil portion from a first material;

forming an attachment portion extending from a root of the airfoil portion, wherein the attachment portion is structured to secure the hybrid turbomachinery component to the gas turbine engine; forming a retention feature adjacent to one of the attachment portion and the airfoil portion; and insert molding a flowpath structure around the retention feature using a second material different than the first material, wherein the flowpath structure retained by the retention feature.

The first material may be a metal alloy and the second material may be a composite material. In one form, the airfoil portion and the attachment portion may be forged as a unitary structure from the first material. In another form, the airfoil portion and the attachment portion may be formed as a unitary structure by twisting plate stock of the first material.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A turbomachinery component for a gas turbine engine, comprising:
   an airfoil portion formed of a first material;
   an attachment portion extending from a root of the airfoil portion and structured to secure the airfoil portion to the gas turbine engine;
   a retention feature disposed adjacent to one of said attachment portion and said airfoil portion, wherein the retention feature includes a body extending outwardly from the one of said attachment portion and said airfoil portion; and wherein the retention feature includes a retainer lip extending outwardly at an angle from a portion of the body, and is spaced apart along the body from the one of said attachment portion and said airfoil portion; and
   a flowpath structure molded around the retention feature and formed of a second material different than the first material, wherein the flowpath structure is retained by the retention feature.

2. The turbomachinery component of claim 1, wherein said airfoil portion and said attachment portion are formed as a unitary structure from the first material.

3. The turbomachinery component of claim 1, wherein the turbomachinery component is structured as a blade, and wherein said flowpath structure is a blade platform defining in part a flowpath in said gas turbine engine.

4. The turbomachinery component of claim 3, wherein said attachment portion is structured to secure said blade to a rotating disk in one of a fan and a compressor of the gas turbine engine.

5. The turbomachinery component of claim 4, wherein the rotating disk includes a slot, and wherein said attachment portion includes a dovetail structured to engage and be radially retained by the slot in the rotating disk.

6. The turbomachinery component of claim 3, wherein said retention feature extends substantially perpendicular from said one of said attachment portion and said airfoil portion.

7. The turbomachinery component of claim 1, wherein said first material is a metal alloy and said second material is a composite material.

8. The turbomachinery component of claim 1, wherein said flowpath structure encapsulates said retention feature.

9. A gas turbine engine, comprising:
   one of a fan and a compressor having a hybrid turbomachinery component, wherein the hybrid turbomachinery component includes:
   an airfoil portion formed of a first material;
   an attachment portion extending from a root of the airfoil portion, wherein the attachment portion is operative to secure the airfoil portion to the gas turbine engine;
   a retention feature adjacent to one of said attachment portion and said airfoil portion, wherein the retention feature includes a body extending outwardly from the one of said attachment portion and said airfoil portion; and wherein the retention feature includes a retainer lip extending outwardly at an angle from a portion of the body, and is spaced apart along the body from the one of said attachment portion and said airfoil portion; and
   a flowpath structure molded to the retention feature and formed of a second material different than the first material, wherein the flowpath structure is retained by the retention feature.

10. The gas turbine engine of claim 9, wherein said airfoil portion and said attachment portion are formed as a unitary structure from the first material.

11. The gas turbine engine of claim 9, wherein the hybrid turbomachinery component is a blade, and wherein said flowpath structure is a blade platform defining in part a flowpath in said gas turbine engine.

12. The gas turbine engine of claim 11, wherein said attachment portion is structured to secure said blade to a rotable disk in one of said fan and said compressor.

13. The gas turbine engine of claim 12, wherein said rotatable disk has a slot, and wherein said attachment portion includes a dovetail structured to engage and be radially retained by said slot in the rotating disk.

14. The gas turbine engine of claim 11, wherein said retention feature extends substantially perpendicular from said one of said attachment portion and said airfoil portion.

15. The gas turbine engine of claim 9, wherein said first material is a metal alloy and said second material is a composite material.

16. The gas turbine engine of claim 9, wherein said flowpath structure encapsulates said retention feature.

17. A method comprising:
   forming an airfoil portion from a first material;
   forming an attachment portion extending from a root of the airfoil portion, wherein the attachment portion is structured to secure the hybrid turbomachinery component to the gas turbine engine;
   forming a retention feature adjacent to one of the attachment portion and the airfoil portion; and
   insert molding a flowpath structure around the retention feature using a second material different than the first material, wherein the flowpath structure is retained by the retention feature.

18. The method of claim 17, wherein the first material is a metal alloy and the second material is a composite material.

19. The method of claim 17, wherein the airfoil portion and the attachment portion are forged as a unitary structure from the first material.

20. The method of claim 17, wherein the airfoil portion and the attachment portion are formed as a unitary structure by twisting plate stock of the first material.

* * * * *